United States Patent [19]

Davidescu et al.

[11] Patent Number: 4,551,345

[45] Date of Patent: Nov. 5, 1985

[54] PROCESS FOR PREPARING A LIQUID AROMA AND AROMATIZING A DRY COFFEE SUBSTRATE WITH SAME

[75] Inventors: Reghina Davidescu, Princeton Junction; Gaetano J. de Ceglie, Palisades Park; Harold W. Jacquett, Palisades Park; Joseph A. Paluzzi, Allentown, all of N.J.

[73] Assignee: General Foods Corporation, White Plains, N.Y.

[21] Appl. No.: 651,504

[22] Filed: Sep. 17, 1984

Related U.S. Application Data

[63] Continuation-in-part of Ser. No. 481,093, Mar. 21, 1983, abandoned.

[51] Int. Cl.$^4$ ............................................. A23F 5/00
[52] U.S. Cl. ................................. 426/594; 426/386
[58] Field of Search ............... 426/594, 385, 386, 384, 426/388, 478

[56] References Cited

U.S. PATENT DOCUMENTS

| | | | |
|---|---|---|---|
| 3,535,118 | 10/1970 | Klein et al. | 426/386 |
| 3,823,241 | 7/1974 | Patel et al. | 426/417 |
| 3,939,291 | 2/1976 | Katz | 426/386 |
| 3,979,528 | 9/1976 | Mahlmann | 426/594 |
| 4,007,291 | 2/1977 | Siedlecki et al. | 426/594 |
| 4,119,736 | 10/1978 | Howland et al. | 426/417 |
| 4,389,422 | 6/1983 | Hudak | 426/388 |

*Primary Examiner*—Raymond Jones
*Assistant Examiner*—Marianne M. Cintins
*Attorney, Agent, or Firm*—Basam E. Nabulsi; Thomas R. Savoie; Daniel J. Donovan

[57] ABSTRACT

A process for preparing a liquid aroma containing concentrated coffee aromatic compounds from a grinder gas frost is described. A higher yield of coffee aromatics is enabled, and these aromatics are of a higher quality. The liquid aroma may be used to aromatize coffee powders, glycerides or other food substrates. Coffee powders aromatized with the liquid aroma are described as having a "buttery" "roasted and ground" coffee aroma.

13 Claims, No Drawings

PROCESS FOR PREPARING A LIQUID AROMA AND AROMATIZING A DRY COFFEE SUBSTRATE WITH SAME

This application is a continuation-in-part of Ser. No. 481,093, filed Mar. 21, 1983, now abandoned.

BACKGROUND OF THE INVENTION

The present invention relates to a process for preparing a liquid aroma containing concentrated coffee aromatic compounds from a grinder gas frost. The liquid aroma produced according to the invention may be used to aromatize a coffee substrate, such as a spray dried, freeze dried or roasted and ground coffee, or a glyceride, such as a coffee oil, or some other food material.

Soluble beverage powders such as spray dried coffee are relatively devoid of aroma as compared to their source or parent material, namely, roasted and ground coffee. Low aroma intensity also exists in certain types of roasted and ground coffee material such as most decaffeinated coffees and the compressed roasted coffee materials described in U.S. Pat. Nos. 1,903,362 to McKinnis, 3,615,667 to Joffee and 4,261,466 to Mahlmann et al. These low-aroma beverage powders and products have an initially low quantity of aroma, such that upon the initial opening of the container containing the product by the consumer, only low aroma impact is detected, and whatever amount of aroma is present in the product is rapidly given up after initial opening of the container, such that subsequent openings of the container during a typical in-use cycle for the product evolve little or no aroma.

To date most efforts to add natural aroma to soluble coffee products have focused on the addition of roasted coffee aroma to soluble coffees such as spray or freeze-dried coffee. The vast majority of commercial soluble coffees are combined with coffee oil such as by spraying the soluble coffee prior to packaging with either a pure or an aroma-enriched coffee oil. In this manner the soluble coffee material will have an aroma more akin to non-decaffeinated roasted and ground coffee. The addition of oil is usually effected by the well-known oil plating technique (shown in U.S. Pat. No. 3,077,405 to Clinton et al. and U.S. Pat. No. 3,148,070 to Mishkin et al.) or by oil injection (shown in U.S. Pat. No. 3,769,032 to Lubsen et al.).

Coffee oil with or without added aromas has been the preferred medium employed to aromatize coffee material since such products may still be designated as being pure coffee; however, techniques developed for the production of coffee oil such as solvent-extracting or expelling coffee oil from roasted coffee are not particularly desirable since the manufacturer is left with either solvent-containing roasted coffee or expelled cake, both of which must be either further processed or discarded. The prior art has certain other drawbacks including the poor flowability of plated coffee particles and the undesirable droplets of oil that can appear on the surface of a liquid beverge prepared from the plated coffee. To overcome the disadvantages and drawbacks of that use of coffee oil or other glyceride material, it is desired that an alternative medium be developed for aromatizing a coffee material.

Johnston and Patel et al. in U.S. Pat. Nos. 2,306,061 and 3,823,241 respectively, teach the aromatization of a beverage substance with coffee grinder gas by directly contacting grinder gas with a beverage substance which has been chilled to a temperature of at least $-15°$ C. These references eliminate the use of coffee oil as an aromatization medium by enabling direct contact of grinder gas with the substrate to be aromatized. However, these methods are not commercially advantageous for several reasons, the primary reasons being that direct contact of grinder gas with a substrate is an inefficient means of mass transfer, that the hold-up time required for said contact is inefficient in a continuous coffee process, and that control of aromatization levels is impossible according to the cited methods.

The coffee art is replete with methods for aromatizing a glyceride with a grinder gas frost, said grinder has frost having been condensed by contact with a chilled medium. For example, U.S. Pat. No. 4,119,736 to Howland et al. discloses removal of a water phase from a pressure vessel containing condensed grinder gas at a pressure of in excess of 506.2 psia and a temperature of greater than $32°$ F., contacting the demoisturized grinder gas with a glyceride, and slowly venting the pressure vessel. Mahlmann in U.S. Pat. No. 3,979,528 discloses a method for aromatizing a glyceride by contacting it with a grinder gas frost in a pressure vessel at various conditions. Among the conditions disclosed by Mahlmann is a rapid pressure release of the pressure vessel to atmospheric pressure at a temperature below room temperature. However, in these references, as is true throughout the coffee art, substantial coffee aromas are lost to the atmosphere by venting rather than being fixed on a food substrate during an aromatization step.

Thus, it is an object of the present invention that an efficient means for aromatizing a substrate be found.

It is a further object that the aromatized substrate possess a coffee aroma comparable in quality to freshly ground roasted coffee.

It is another object that the yield of aromatized substrate per volume of coffee grinder gas be increased over prior art systems.

SUMMARY OF THE INVENTION

A process has now been discovered for concentrating a grinder gas frost by separating 90% of its carbon dioxide content and 100% of its water and then further concentrating the water-free frost to obtain a liquid aroma containing concentrated coffee aromatic compounds. The liquid aroma produced by the process of the present invention may be used to aromatize a substrate, such as roasted and ground coffee, or by contacting the liquid aroma with a glyceride, such as coffee oil, and then contacting the glyceride with the substrate. The process of the invention is comprised of the steps of:

(a) condensing coffee grinder gas as a frost;

(b) placing the grinder gas frost in a pressure vessel;

(c) supplying heat to the contents of the vessel and allowing the frost to equilibrate at a pressure in excess of 750 psi, thereby forming three phases, a water phase, a liquid carbon dioxide phase, and a gaseous carbon dioxide phase;

(d) draining the water phase from the vessel;

(e) chilling a second vessel to a temperature of less than $-80°$ F.;

(f) venting from below the liquid carbon dioxide surface in the first vessel through a line into the second vessel for a period sufficient to transfer substantially all the liquid carbon dioxide from the first to the second vessel, wherein a solid aroma-rich phase is formed;

(g) isolating the second vessel from the first vessel and warming the second vessel to a temperature of between about $-20°$ F. and $15°$ F., while venting sublimed gaseous carbon dioxide to the atmosphere, thereby producing a highly concentrated, somewhat effervescent liquid coffee aroma.

The concentrated coffee aroma phase, hereinafter liquid aroma, produced according to the present invention may be used to aromatize a coffee or other food substrate, or a glyceride such as coffee oil. It has been found that a higher yield and a better quality of coffee aromas are recovered by use of said concentrated liquid aroma than in prior art methods which typically employ a dilute grinder gas frost to aromatize a glyceride medium. Soluble coffee powders aromatized with the liquid aroma of this invention have been found to have a highly desirable "buttery", "roasted and ground" jar aroma by an expert panel. Further, the effervescence of said liquid aroma is caused by the presence of entrained gaseous carbon dioxide and has been found to be advantageous in preventing undesirable oxidation of the oxygen sensitive coffee aromas.

DETAILED DESCRIPTION OF THE INVENTION

The present invention is directed to combining a liquid aroma containing grinder gas aromatics which have been concentrated and condensed from a grinder gas frost with coffee solids, a glyceride, or other food material. This invention is particularly described in terms of coffee grinder gas, which contains 80% to 90% by weight carbon dioxide; however, it is to be understood that other aroma-bearing gases which have a high carbon dioxide content such as coffee percolator vent gas and coffee roaster gas, may likewise be employed and are considered to be within the scope of this invention.

The most readily available source of grinder gas may be obtained by enclosing or hooding coffee grinding equipment, such as commercial grinders. The gases liberated from the ground coffee may be removed by a pump or rotary blower; additionally, when desired, a stream of inert, preferably moisture free, gas may be used to sweep gas from the coffee and to have the grinding operation take place in a substantially inert atmosphere. Such a process is described in U.S. Pat. No. 2,156,212 which describes a method of collecting gases evolved during roasting, but which can be equally applied to the collection of gases evolved during the grinding or cellular disruption of whole freshly roasted coffee beans. If pumping is employed, it may be desirable to cool the gas ahead of the pump so that the heat added by pumping will not deteriorate the aromatics contained in the gas.

The chemical composition of the evolved gas is largely carbon dioxide together with water vapor and the characteristic aromatic constituents of roasted coffee. The amount of moisture in the gas may be lowered by the use of dry roasting conditions and low-moisture quenches or quenching mediums. The evolved gas is preferably passed through a first condenser where it is cooled to between 35° and 50° F. and where substantial quantities of water are removed. The relatively low-moisture gas is then fed to a condenser, such as a jacketed, vertically-mounted, scraped-wall heat exchanger, which is cooled by means of a liquid gas refrigerant. Preferably the condenser is cooled by means of liquid nitrogen and the gas flow into the exchanger is maintained within the range of about 1 to 5 cubic feet per minute per square foot of heat exchanger surface. The nitrogen gas that evolves from the cooling system is useful as an inert gas stream which might be used elsewhere in the soluble coffee process, such as sweeping grinder gas from the grinder or inert gas packaging of the soluble coffee product.

The aroma bearing gas is condensed into the form of a frost as it comes into contact with the heat transfer wall of the condenser. Typical grinder gas frost is collected at a liquid nitrogen jacket temperature of $-195°$ F. to $-225°$ F. contains approximately 87% carbon dioxide, approximately 10% water, and approximately 3% coffee aromas. The frost, as it is removed from the condenser wall and collected, is thus very dilute in the coffee aromas which are needed to overcome the relatively devoid aroma character of typical soluble beverage powders such as spray dried coffee. The frost may be held for a short period at low, such as liquid nitrogen, temperatures without deteriorating; however, it is preferred to immediately utilize the frost in accordance with this invention.

According to this invention, the grinder gas frost is placed in a pressure vessel. A sufficient amount of the grinder gas frost is added to avoid the presence of an unsaturated carbon dioxide vapor phase. Heat is added to the contents of the vessel, such as by means of a 70° F. to 85° F. water jacket, to sublime the grinder gas frost and form a headspace pressure. At approximately 75 psia solid carbon dioxide changes to liquid. The temperature corresponding to this phase change is $-70°$ F. At this condition, water and any trace glyceride present, as well as some of the organic aromatics, are in the solid state. The temperature of the vessel contents is raised preferably to about room temperature, at which condition the grinder gas aromatics will diffuse and establish an equilibrium among the gaseous carbon dioxide, liquid carbon dioxide, and water phases. After the frost within the vessel has reached the desired temperature, and possibly after an equilibrium period of up to several hours, a peak pressure is reached.

The vessel contents at this peak pressure may be in three distinct phases including a bottom water phase, a liquid carbon dioxide phase, and a gaseous carbon dioxide phase with aroma present in each phase. After the pressure within the vessel has reached its peak, generally at about 750 psia to about 950 psia, the water phase is removed from the vessel. This can be done by simply draining the water through a valve in the bottom of the vessel. In one embodiment of the invention, the temperature of the pressure vessel contents is increased to greater than 87.8° F., the critical temperature of carbon dioxide, thereby eliminating the presence of the liquid carbon dioxide phase. A complete water drain is thereby ensured because any likelihood that water may become entrained in the liquid carbon dioxide phase is eliminated. However, temperatures in excess of about 90° F. should be avoided to prevent undue degradation of the coffee aromas. Optionally, the removed water phase may be contacted with a glyceride, preferably coffee oil, in any apparatus that provides efficient liquid-liquid contact to recover aromatics contained therein.

After the water phase has been drained, the pressure vessel is maintained at a temperature of about 75° F. (23.9° C.) to about 85° F. (29.4° C.) and thereby at a pressure of about 750 psia to about 950 psia, for a period sufficient to ensure the existence of vapor-liquid equilibrium within the pressure vessel. After equilibrium has been established, and possibly after a holdup period of up to several hours, the pressure vessel is vented from below the liquid carbon dioxide surface, preferably from the bottom of the pressure vessel, through a vent line into a second pressure vessel. The second pressure vessel is pre-chilled, generally to a temperature of less than $-80°$ F., and preferably to a temperature of less than $-110°$ F. Said pre-chilling is generally accomplished by circulating a chilling medium, as for example brine or liquid carbon dioxide or preferably liquid nitrogen, through the pressure vessel jacketing. The vented liquid carbon dioxide enters the second pressure vessel through the vent line.

The second pressure vessel may be either sealed or vented to the atmosphere as the liquid carbon dioxide phase enters its confines. As the liquid carbon dioxide enters the second pressure vessels, a fraction of the carbon dioxide flashes to the vapor phase. The latent that required for the liquid-to-vapor phase change is supplied by the remaining liquid carbon dioxide stream which contains coffee aromatics, thereby resulting in a freezing of the liquid carbon dioxide plus aromatics to the solid phase. Preferably, the second pressure vessel is sealed until a pressure in excess of atmospheric pressure is noted, typically about 50 psi to about 200 psi, at which time it is vented to the atmosphere through a separate vent line, typically maintaining a back-pressure of about 50 psi. In an alternate embodiment of the invention, a series or battery of "first" pressure vessels may be loaded with grinder gas frost and simultaneously or sequentially vented from the bottom into a single "second" pressure vessel.

The rate at which the liquid carbon dioxide phase is vented to the second pressure vessel is controlled so as to prevent the vent line from the first to the second pressure vessel from freezing and thereby restricting the flow. Said vent line typically enters the second pressure vessel from the top and typically extends about $\frac{1}{4}$ to about $\frac{2}{3}$ of the distance to the bottom of the vessel. A nozzle is typically affixed to the end of the vent line, thereby atomizing the transferred liquid carbon dioxide phase as it passes therethrough. The diameter of the vent line is selected so as to provide efficient transfer of the liquid carbon dioxide phase while not allowing a large degree of gaseous dioxide phase to enter the vent line.

The vent line is closed after the transfer of the liquid carbon dioxide phase from the first pressure vessel to the second is completed. It is preferred that the vent line be closed immediately upon the completion of said transfer in order to prevent relatively aroma-free gaseous carbon dioxide from entering the second pressure vessel. The completion of said liquid carbon dioxide phase transfer may be monitored by placing a site glass in the vent line or by monitoring the rate of pressure change in either pressure vessel. Typically, said transfer is complete when the vent rate from the second pressure vessel increases noticeably and when the pressure in the first pressure vessel drops to about 200 psi to 400 psi. It is preferred that the vent line be closed when the pressure in the first pressure vessel is about 325 psi to 375 psi so that a minimal amount of aroma-free gaseous carbon dioxide is allowed to enter the second pressure vessel. The gaseous carbon dioxide which remains in the first pressure vessel after the vent line is closed is typically discarded.

It has been found that a very minimal amount of coffee aromas are lost from the second pressure vessel when it is vented while maintaining a back-pressure. Said vent stream has been analyzed for coffee aromatics content by gas chromatography (GC). GC is an analytic technique routinely used to measure the quantity of coffee aromas present in a particular sample. Total GC counts measure the total aromatic content of a sample whereas individual GC "peaks" on a GC printout measure amounts of individual compounds in a sample. Comparison of GC peaks is often used to compare the quality of one sample to another. The vent stream has been found to typically contain about $1 \times 10^4$ to about $5 \times 10^4$ total GC counts. The liquid aroma produced according to the invention, by comparison, has been found to contain about $3 \times 10^6$ to about $8 \times 10^6$ total counts, or approximately 100 times the level of aromatics lost by venting the second pressure vessel.

The solid frost contained in the second pressure vessel is next heated, typically to about $-20+$ F. to $0°$ F., thereby forming a liquid aroma. Optionally, a second water drain may be accomplished by increasing the temperature of the liquid aroma to in excess of $32°$ F., draining the water from the bottom of the second pressure vessel, and then chilling the liquid aroma back to about $-20°$ F. to about $0°$ F. It is desirable to maintain the liquid aroma at a temperature of less than about $-20°$ F. to about $0°$ F. for product stability, thereby preventing oxidation and rancidity. The liquid aroma may be collected from the pressure vessel and stored in a sealed container, generally at a temperature of less than $-20°$ F., and preferably at less than about $-110°$ F. The liquid aroma produced according to the invention may be used to aromatize a glyceride, a spray dried, freeze dried or agglomerated coffee substrate, roasted and ground coffee, a microporous particle such as is described in U.S. Pat. No. 4,389,422 to Hudak, or any food material which may become apparent to one skilled in the art. The aromatization of a glyceride, as for example coffee oil, may be accomplished by liquid-liquid contact in a batch or continuous system. It has been found that a higher level of aroma fixation as measured by total GC counts is achieved by contacting liquid aroma with coffee oil than by contacting grinder gas frost with coffee oil, as is described in U.S. Pat. No. 4,119,736 to Howland et al., in a controlled experiment using identical amounts of grinder gas frost. Said aroma fixation increase has generally been about 50 to 60% as measured by total GC counts. The aromatized glyceride produced by contact with said liquid aroma may be used to aromatize a coffee powder or other food substrate, and has been found to give a "buttery" "Roasted & Ground" coffee aroma to the aromatized substrate.

The liquid aroma produced according to the invention also may be used to aromatize dry substrates such as soluble coffee powders, roasted and ground coffee and, in a preferred embodiment of the invention, microporous particles. The term "soluble coffee powder" is meant to refer to not only those materials consisting of 100% coffee but also to substitute or extended coffees which may contain roasted grain, chicory and/or materials with adsorbing capacity in combination with coffee. The liquid aroma adsorbed onto the dry substrate in accordance with this invention has been found to be stable during prolonged storage under inert conditions such as that normally existing in packaged soluble coffee products. The sorbed liquid aroma has been found to produce desirable headspace aroma in containers and jars, typically described as "buttery" and "roasted and ground".

EXAMPLE 1

(A) A prechilled 1 l. Hoke bomb was loaded with 500 g. of grinder gas frost and the bomb was placed in a 70° F. water bath. After the equilibrium pressure of 840 psig was reached the bomb was held for one hour. Three phases were formed inside the vessel: gaseous $CO_2$, liquid $CO_2$ and liquid $H_2O$.

The water phase was drained and the 1 l. Hoke bomb was connected to a 2 l. Parr bomb prechilled to $-110$ F. and maintained in dry ice. The Parr bomb was used as the collecting vessel for the concentrated water-free frost as the Hoke bomb was vented through the bottom opening.

The 2 l. Parr bomb was vented to the atmosphere while maintaining a back pressure of about 80–200 psi. When the pressure in the Hoke bomb dropped to 375 psi, the line connecting the Hoke bomb to the Parr bomb was sealed, thereby isolating one from the other. The gaseous phase then remaining in the Hoke bomb was discarded.

A solid frost highly concentrated in coffee aromatics was now contained in the Parr bomb. It constituted approximately 20% of the initial grinder gas frost by weight (i.e., about 100 g). The temperature of the Parr bomb was raised to 0° F. and the solid frost was thereby converted to a liquid aroma. The Parr bomb was held at 0° F. for 7 hours and all gaseous carbon dioxide released from the effervescent liquid aroma was maintained as a headspace within the Parr bomb.

The liquid aroma was the collected from the Parr bomb and stored in a sealed container at 0° F. Analysis by GC demonstrated the liquid aroma to be very rich in coffee aromatics, measuring $6 \times 10^6$ total GC counts.

EXAMPLE 2

A coffee oil was aromatized by contact with the liquid aroma of Example 1. The liquid aroma was first put into a mixing vessel, with the coffee oil added on top, the ratio being 3:1 coffee oil to liquid aroma by weight. The mixing vessel contents were maintained at 70° F. for 5 minutes with agitation, at which point an aromatized coffee oil was removed therefrom. Analysis by GC found the aromatized coffee oil to measure $4.5 \times .10^6$ total GC counts.

The aromatized glyceride was standardized by blending with unaromatized coffee oil to a standard total GC count level and then applied to soluble coffee at a level of 0.1% by weight. Said aromatized soluble coffee was described as having a 37 buttery" "R&G" coffee aroma by an expert panel.

EXAMPLE 3

An unaromatized dry coffee substrate obtained by high-pressure spraying of a liquid coffee extract into liquid nitrogen is blended at room temperature with $-80$ mesh ground soluble agglomerated spray-dried coffee powder at a ratio of 19:1 ground coffee to substrate by weight. 5.0 g substrate (111-$m^2$/g) is placed in 1 l flask at room temperature and atmospheric pressure. Vacuum is then pulled on the flask containing substrate to $<1.0$ mm Hg. A 0.5 cc liquid syringe, prechilled to $\sim 15°$ F., was used to withdraw a 0.46 cc volume of liquid aroma produced in Example 1 which was injected into the 1 l flask with substrate (under vacuum). The flask with substrate and injected aroma was held under vaccum at room temperature for 1 hr. After 1 hr. the vacuum was released to atmospheric pressure using $N_2$ gas. The aromatized substrate was then transferred to a small container at room temperature and stored in liquid nitrogen.

The aromatized substrate was blended at dry ice temperature with $-80$ mesh ground soluble coffee powder (prechilled to dry ice temperature before blending) at a ratio of 19:1 ground coffee to substrate. The blended aromatized substrate was packed at 0.5% by weight to the bottom of the jar with agglomerate coffee and at 1.0% by weight to the middle of the jar with freeze dried coffee.

Generally, the product was found to be comparable in intensity and had aroma notes similar to a currently commercially available aromatized soluble coffee product and described as buttery, slight sulfury and roasted and ground-like.

The jar aroma possessed by th final products containing the blended aromatized materials after three weeks closed jar storage at room temperature was found by an expert panel to be comparable to grinder gas-enriched, oil-plated soluble coffee.

We claim:

1. A process for preparing a liquid coffee aroma comprising the steps of:
   (a) condensing coffee grinder gas as a frost;
   (b) placing the grinder gas frost in a pressure vessel;
   (c) supplying heat to the contents of the vessel and allowing the frost to equilibrate at a pressure in excess of 750 psi, thereby forming three phases, a water phase, a liquid carbon dioxide phase, and a gaseous carbon dioxide phase;
   (d) draining the water phase from the vessel;
   (e) chilling a second vessel to a temperature of less than $-80°$ F.;
   (f) venting from below the liquid carbon dioxide surface in the first vessel through a line into the second vessel for a period sufficient to transfer substantially all the liquid carbon dioxide from the first to the second vessel, wherein a solid aroma-rich phase is formed;
   (g) isolating the second vessel from the first vessel and warming the second vessel to a temperature of between about $-20°$ F. and 15° F., thereby producing a highly concentrated, effervescent liquid coffee aroma.

2. The process of claim 1 wherein the second vessel of step (e) is chilled to less than $-110°$ F.

3. The process of claim 1 wherein the venting of step (f) occurs from the bottom of the first vessel.

4. The process of claim 1 wherein the venting of step (f) continues until the pressure in the first vessel drops to a pressure of from about 200 psi to about 400 psi.

5. The process of claim 4 wherein said venting continues until the pressure in the first vessel drops to a pressure of from about 325 psi to about 375 psi.

6. The process of claim 1 wherein a nozzle is affixed to the end of the line of step (f) within the second vessel.

7. The process of claim 1 further comprising warming the effervescent liquid coffee aroma in a sealed pressure vessel to between 32° F. to 40° F. thereby forming three phases, a water phase, a liquid carbon dioxide phase, and a gaseous carbon dioxide phase; draining the water phase; and chilling the vessel to between about $-20°$ F. to about 15° F.

8. The process of claim 1 further comprising contacting the liquid aroma with a food substrate.

9. The process of claim 8 wherein said substrate is a coffee powder.

10. The process of claim 9 wherein said coffee powder is microporous.

11. The process of claim 8 wherein said substrate is a glyceride.

12. The process of claim 11 wherein said glyceride is coffee oil.

13. The process of claim 8 wherein said substrate is roasted and ground coffee.

* * * * *